Sept. 3, 1968  P. E. TROST ETAL  3,399,921

LATCHING MECHANISM

Filed Dec. 27, 1966

INVENTORS:
PAUL E. TROST
RICHARD L. PALEN
EVAN HAMMOND
BY Kenneth C. Witt
ATTORNEY

United States Patent Office 3,399,921
Patented Sept. 3, 1968

3,399,921
LATCHING MECHANISM
Paul E. Trost, Michigan City, Ind., Richard L. Palen, New Buffalo, Mich., and Evan Hammond, Michigan City, Ind., assignors to Clark Equipment Company, a corporation of Michigan
Filed Dec. 27, 1966, Ser. No. 604,746
13 Claims. (Cl. 296—35)

ABSTRACT OF THE DISCLOSURE

This invention relates to a latching mechanism for securing a freight container or the like to the bed of a vehicle for transport. The mechanism latches automatically when the container is placed on the vehicle, and it may be unlatched when it is desired to remove the container from the vehicle.

Reference herein to the term "bed" of a vehicle means the chassis, frame, platform or other supporting structure afforded by a highway trailer, railroad car or other vehicle for transporting a load, or a fixed supporting structure, while the term "container" is used herein generically to designate a freight container, pallet or any other equivalent load-handling device which it is desired to secure to such a bed.

In carrying out our invention in one preferred form thereof, we provide two latch members which are pivotally mounted on the bed. One of these is movable between an unlatched position and a latched position in which it secures the container to the bed. The second latch member also is movable between two positions. The first-mentioned latch member in its unlatched position holds the second latch member in a first position, while the second latch member in its second position holds the first latch member in its latched position and prevents the container from becoming detached from the vehicle.

For a clearer and more complete understanding of our invention reference should be had to the accompanying drawing, wherein.

Figure 1:
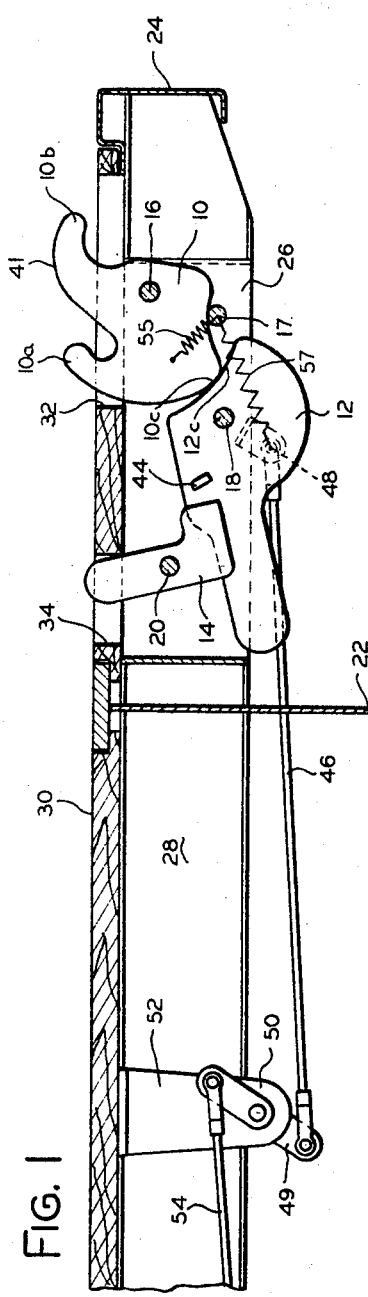
FIGURE 1 shows the latch mechanism in the unlatched position.

Referring to the drawing, we have indicated the first latch member generally by the numeral 10, the second latch member by the numeral 12, and a third latch member by the numeral 14. The latch member 10 is pivotally mounted at 16 on the bed of the vehicle, while the latch member 12 is pivotally mounted at 18 on the bed of the vehicle, and the latch member 14 is pivotally mounted at 20 on the bed of the vehicle. The bed of the vehicle includes, in this illustration, structural members such as a longitudinal I-beam member 22, longitudinal edge member 24, and transverse members 26 and 28. The bed also includes a deck or floor 30 which is provided with openings 32 and 34 respectively for the first latch member and the third latch member.

Figure 2:
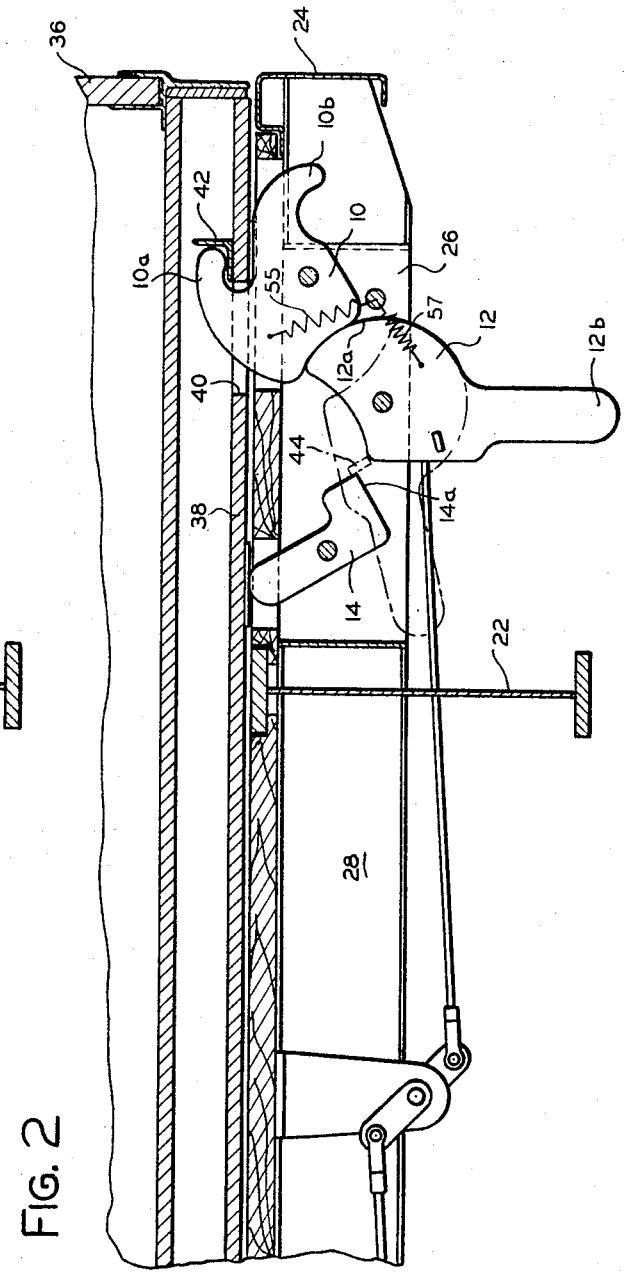
FIGURE 2 shows the latch mechanism in the latched position.

The first latch member 10 includes two upwardly projecting portions 10a and 10b and in the unlatched position illustrated in FIG. 1, both of these portions project above the floor 30. When a container is placed in the proper position on the bed of the vehicle the latch member 10 is pivoted by the weight of the container and automatically latches the container to the vehicle as illustrated in FIG. 2 of the drawing. As shown in FIG. 2 the container is indicated generally by the numeral 36. It includes various structural portions including a bottom planar member 38 having an opening 40 therethrough to admit projection 10a on the first latch member, and a channel member 42 which projection 10a engages to hold the container in position on the vehicle.

When the container is lowered onto the bed of the vehicle the bottom member 38 thereof engages a projection 10b on the first latch member at approximately the location indicated by the numeral 41 of FIG. 1. As lowering is continued, latch member 10 is moved to the latched position illustrated in FIG. 2, the latch member 10 pivoting clockwise about pivot 16 when such movement of latch member 10 occurs. Latch member 12 also pivots simultaneously, but it moves counterclockwise about pivot 18 to the location illustrated in FIG. 2 in which position the arcuate portion 12a thereon engages the mating portion of latch member 10 and holds the latter in latched position.

When it is desired to unlatch the mechanism again to permit the removal of container 36 from the vehicle, latch member 12 is moved from the solid line position in FIG. 2 to the phantom position shown in this figure, which is the same as the position shown in FIG. 1. This may be accomplished by manually grasping the handle portion 12b of member 12 and moving it as specified. In the phantom position shown in FIG. 2 the latch member 12 is held up, and prevented from moving downward counterclockwise again, by stop member 44 which engages on the corner of latch member 14 as illustrated in FIG. 2. Thus, latch member 12 is held out of engagement with latch member 10, and this permits latch member 10 to turn by moving counterclockwise to the position of FIG. 1 in which position it is unlatched from the container.

The relation and operation of latch member 14 and stop member 44 may be described in more detail as follows. In FIG. 2 latch member 14 is restricted from pivoting clockwise by bottom member 38 of the container, however, it may pivot a limited amount counterclockwise. As latch member 12 is pivoted clockwise during the unlatching operation, stop member 44 thereon strikes the lower inclined surface 14a of member 14 and causes member 14 to pivot counterclockwise until stop member 44 moves past member 14 whereupon latch member 14 then drops back to the position illustrated in FIG. 2. When latch member 12 is then released it likewise drops back to the position illustrated in phantom in FIG. 2.

After latch member 12 has been thus operated, the container may then be removed by lifting it off the vehicle, and when this occurs latch member 14 moves clockwise from its FIG. 2 position, in which it has been held by the presence of the container, to its FIG. 1 position, whereupon the complete cycle of latching and unlatching has been completed. In the FIG. 1 position it will be observed that the first latch member 10 holds the second latch member 12 in its upper position, by engagement between portion 10c of the first latch member with portion 12c of the second latch member, so the fact that latch member 14 is moved out of latching relationship with member 12 does not permit any change in the position of the latch member 12.

As illustrated, means are provided for connecting this latch mechanism to another latch mechanism on the opposite side of the vehicle which is allochirally related to this mechanism. The connection means includes a rod 46 which is pivotally connected at 48 to latch member 12. In the center of the vehicle, rod 46 is pivotally connected to the lower end of a two-arm lever 49 which is pivoted at its center, as indicated by the numeral 50, on a bracket 52 which is secured to the bed of the vehicle. Another rod 54 is pivotally connected at the upper end of lever 49 and at its outer end is connected to another latch member corresponding to the second latch member 12 which has other latch members similar to members 10 and 14 associated with it.

When latch member 10 pivots counterclockwise to its unlatched position its pivotal movement is stopped by a pin 17 to hold it in proper position for engaging and latching the next container which is placed on the vehicle.

While the three latch members 10, 12 and 14 have been described herein as operated by gravity and by manual operation in the case of latch member 12, it will be understood that springs can be provided if desired to assist in the operation of one or more of these latch members. To illustrate this we have shown schematically on the drawings tension springs 55 and 57. Spring 55 which is extended in FIG. 2 and contracted in FIG. 1 assists the force of gravity in urging latch member 10 toward its FIG. 1 position. Spring 57 is extended in FIG. 1 and contracted in FIG. 2, and assists the force of gravity in urging latch member 12 toward its FIG. 2 position.

While we have described and illustrated herein preferred embodiments of our invention, it will be appreciated that modifications may be made therein. Therefore, it should be understood that we intend to cover by the appended claims all such modifications which fall within the true spirit and scope of our invention.

We claim:

1. A latching mechanism comprising, a first pivotally mounted member movable to an unlatched position and to a latched position, a pivotally mounted second member movable to a first position and to a second position, the said first member having an arcuate surface thereon which may be engaged by the said second member, the said second member having an arcuate surface thereon which may be engaged by the said first member, the said first member in its unlatched position holding the said second member in its first position, and the said second member in its second position holding the said first member in its latched position.

2. A latching mechanism as specified in claim 1 in which the said first member is movable at least partially by gravity from the latched position to the unlatched position and the said second member is movable at least partially by gravity from its first position to its second position.

3. A latching mechanism as specified in claim 1 in which a third pivotally mounted member is provided, said third member being arranged to hold the said second member in its first position.

4. A latching mechanism as specified in claim 3 in combination with a container and a vehicle having a floor portion, the said floor portion of the vehicle having openings therein through which the said first and third members project, both the said first and third members being engaged by the said container and pivoted when the container is placed on the said floor portion.

5. A latching mechanism as specified in claim 1 in combination with a container and a vehicle having a floor portion, the said floor portion having an opening therein, and in which the said first member includes two upwardly extending projections which project up through the said opening in the unlatched position, one of the said projections being engaged by the container when it is lowered onto the said floor, and the other said projection thereupon moving into engagement with the container to latch it to the vehicle.

6. A latching mechanism as specified in claim 5 in which, when the said first member pivots to latch the container to the vehicle, the said second member automatically pivots to engage the first latch member and lock it in the latched position.

7. A latching mechanism as specified in claim 1 in combination with a vehicle in which allochirally related latch members corresponding to the said first and second members are pivotally mounted on another portion of the said vehicle, and the said second member and the corresponding latch member in the other location are interconnected to provide for simultaneous operation of the two latching mechanisms.

8. A mechanism for latching a container to a vehicle comprising a first latch member pivotally mounted on the vehicle for movement into and out of locking relation with a portion of the container, the said first latch member arranged to be engaged by the container as it is placed on the vehicle and including a concave arcuate surface thereon, said placing action moving the said first latch member to a latched position in which it locks the container to the vehicle, and a second latch member pivotally mounted on the vehicle and movable into position to engage the said arcuate surface of the said first latch member and hold the first latch member in the latched position when the said first latch member moves from the unlatched to the latched position.

9. A mechanism as specified in claim 8 which includes a third latch member, said third latch member being pivotally mounted on the vehicle and arranged to hold the said second latch member in a position permitting the movement of said first latch member from the latched to the unlatched position.

10. A mechanism as specified in claim 9 in which the said third latch member is held in position to engage the said second latch member by the weight of the container on the vehicle and is released from such position by removal of the container from the vehicle.

11. A latching mechanism as specified in claim 3 in which the said third member may be held in a predetermined position, a stop member carried by the said second member is arranged to contact the said third member as the second member is moved between its second position and its first position, the third member being arranged to pivot from its said predetermined position to allow the said stop member to pass and to pivot back again and engage the stop member thereby to prevent the second member from returning to its second position.

12. A latching mechanism as specified in claim 1 in which a first spring is connected to the said first member urging it toward its unlatched position, and a second spring is connected to the said second member urging it toward its second position.

13. A latching mechanism as specified in claim 1 in which the said first member in its unlatched position engages the said arcuate surface on the second member to hold the second member in its first position, and the said second member in its second position engages the said arcuate surface on the first member to hold the first member in its latched position.

References Cited

UNITED STATES PATENTS

| | | | |
|---|---|---|---|
| 890,873 | 6/1908 | Robinson | 292—108 |
| 3,027,025 | 3/1962 | Tantunger | 296—35 |
| 3,158,106 | 11/1964 | Clejan | 105—366 |
| 3,355,207 | 11/1967 | Newman | 292—108 |

BENJAMIN HERSH, *Primary Examiner.*

L. D. MORRIS, JR., *Assistant Examiner.*